(12) United States Patent
Ong et al.

(10) Patent No.: US 8,362,154 B2
(45) Date of Patent: Jan. 29, 2013

(54) METATHESIS OF NITRILE RUBBERS IN THE PRESENCE OF TRANSITION METAL COMPLEX CATALYSTS

(75) Inventors: Christopher Ong, Leverkusen (DE); Werner Obrecht, Moers (DE); Oskar Nuyken, Munich (DE); Julia Maria Muller, Blaustein (DE)

(73) Assignee: LANXESS Deutschland GmbH, Leverkusen (DE)

( * ) Notice: Subject to any disclaimer, the term of this patent is extended or adjusted under 35 U.S.C. 154(b) by 712 days.

(21) Appl. No.: 12/190,840

(22) Filed: Aug. 13, 2008

(65) Prior Publication Data
US 2009/0054597 A1     Feb. 26, 2009

(30) Foreign Application Priority Data
Aug. 21, 2007   (EP) ..................... 07114656

(51) Int. Cl.
*C08F 20/44*          (2006.01)
(52) U.S. Cl. ............ 525/329.1; 502/152; 502/155; 502/167; 502/171; 525/329.3; 525/329.7; 525/331.9; 525/339; 525/370; 526/171; 526/172; 528/485; 556/136; 556/137
(58) Field of Classification Search .......... 525/329.1, 525/370, 329.3, 329.7, 331.9, 339; 502/152, 502/155, 167, 171; 526/171, 172; 528/485; 556/136, 137
See application file for complete search history.

(56) References Cited

U.S. PATENT DOCUMENTS

| | | | |
|---|---|---|---|
| 3,700,637 A | 10/1972 | Finch, Jr. ................. 260/83.3 |
| 4,464,515 A | 8/1984 | Rempel et al. ............... 525/338 |
| 4,503,196 A | 3/1985 | Rempel et al. ............... 525/338 |
| 4,581,417 A | 4/1986 | Buding et al. | |
| 4,631,315 A | 12/1986 | Buding et al. | |
| 4,746,707 A | 5/1988 | Fiedler et al. | |
| 4,795,788 A | 1/1989 | Himmler et al. | |
| 4,812,528 A | 3/1989 | Rempel et al. | |
| 4,978,771 A | 12/1990 | Fiedler et al. | |
| 5,728,917 A | 3/1998 | Grubbs et al. | |
| 5,831,108 A | 11/1998 | Grubbs et al. | |
| 6,610,626 B2 | 8/2003 | Grubbs et al. ............... 502/155 |
| 6,673,881 B2 | 1/2004 | Geurin ........................ 526/160 |
| 6,683,136 B2 | 1/2004 | Guo et al. .................. 525/329.3 |
| 6,780,939 B2 | 8/2004 | Guerin et al. .............. 525/329.1 |
| 6,841,623 B2 | 1/2005 | Guerin et al. ............... 525/230 |
| 7,235,601 B2 | 6/2007 | Guerin et al. ............... 524/565 |
| 7,262,244 B2 | 8/2007 | Guerin ........................ 524/565 |
| 7,329,758 B1 | 2/2008 | Grubbs et al. ............... 548/103 |
| 2003/0069374 A1 * | 4/2003 | Grubbs et al. ............... 526/171 |
| 2003/0236427 A1 | 12/2003 | Grubbs et al. ............... 558/238 |
| 2004/0127647 A1 | 7/2004 | Ong et al. ..................... 525/191 |
| 2004/0132891 A1 | 7/2004 | Ong et al. ..................... 524/492 |
| 2007/0049699 A1 | 3/2007 | Nasreddine et al. ....... 525/329.1 |
| 2007/0049700 A1 | 3/2007 | Obrecht et al. ............ 525/329.1 |
| 2007/0208136 A1 | 9/2007 | Nasreddine et al. .......... 525/178 |
| 2008/0214758 A1 | 9/2008 | Guerin ........................ 526/171 |

FOREIGN PATENT DOCUMENTS
EP   0 419 952   4/1991
EP   0 471 250   2/1992

OTHER PUBLICATIONS

Organometallics 2001, 20, 5314-5318, Sanford, Love, Grubbs, "A Versatile Precursor for the Synthesis of New Ruthenium Olefin Metathesis Catalysts".
Angew. Chem. Int. Ed. 2002, 41, 4038-4040, Grela et al, "A Highly Efficient Ruthenium Catalyst for Metathesis Reactions".
Grubbs et al, Angew. Chem. Int. Ed. 2002, 41 (21) 4035-4037, "A Practical and Highly Active Ruthenium-Based Catalyst that Effects the Cross Metathesis of Acryloninitrile".
ScienceDirect, Tetrahedron Letters 48, (2007), pp. 4203-4205, Zhang et al; "Highly active ruthenium-based catalyst for metathesis of cyano-contained olefins".
Journal of Molecular Catalysis, 46, (1988)m pp. 433-444, Stelzer et al; "Metathesis Degradation of Acrylonitrile/Butadiene Copolymers".

* cited by examiner

*Primary Examiner* — David W Wu
*Assistant Examiner* — Robert Jones, Jr.
(74) *Attorney, Agent, or Firm* — Jennifer R. Seng

(57)         ABSTRACT

A novel process for the metathetic degradation of nitrile rubbers is provided which uses specific transition metal complex catalysts showing an increased activity.

30 Claims, No Drawings

METATHESIS OF NITRILE RUBBERS IN THE PRESENCE OF TRANSITION METAL COMPLEX CATALYSTS

The present invention relates to a process for the molecular weight degradation of nitrile rubbers by metathesis in the presence of transition metal complex catalysts.

The term nitrile rubber, also referred to as "NBR" for short, refers to rubbers which are copolymers or terpolymers of at least one α,β-unsaturated nitrile, at least one conjugated diene and, if desired, one or more further copolymerizable monomers.

Hydrogenated nitrile rubber, also referred to as "HNBR" for short, is produced by hydrogenation of nitrile rubber. Accordingly, the C=C double bonds of the copolymerized diene units have been completely or partly hydrogenated in HNBR. The degree of hydrogenation of the copolymerized diene units is usually in the range from 50 to 100%.

Hydrogenated nitrile rubber is a specialty rubber which has very good heat resistance, an excellent resistance to ozone and chemicals and also an excellent oil resistance.

The abovementioned physical and chemical properties of HNBR are associated with very good mechanical properties, in particular a high abrasion resistance. For this reason, HNBR has found wide use in a variety of applications. HNBR is used, for example, for seals, hoses, belts and clamping elements in the automobile sector, also for stators, oil well seals and valve seals in the field of oil extraction and also for numerous parts in the aircraft industry, the electronics industry, mechanical engineering and shipbuilding.

Commercially available HNBR grades usually have a Mooney viscosity (ML 1+4 at 100° C.) in the range from 55 to 120, which corresponds to the number average molecular weight $M_n$ (method of determination: gel permeation chromatography (GPC) against polystyrene equivalents) in the range from about 200 000 to 700 000. The polydispersity index PDI ($PDI=M_w/M_n$, where $M_w$ is the weight average molecular weight and $M_n$ is the number average molecular weight), which gives information about the width of the molecular weight distribution, measured here is frequently 3 or above. The residual double bond content is usually in the range from 1 to 18% (determined by IR spectroscopy).

The processability of HNBR is subject to severe restrictions as a result of the relatively high Mooney viscosity. For many applications, it would be desirable to have an HNBR grade which has a lower molecular weight and thus a lower Mooney viscosity. This would decisively improve the processability.

Numerous attempts have been made in the past to shorten the chain length of HNBR by degradation. For example, the molecular weight can be decreased by thermomechanical treatment (mastication), e.g. on a roll mill or in a screw apparatus (EP-A-0 419 952). However, this thermomechanical degradation has the disadvantage that functional groups such as hydroxyl, keto, carboxyl and ester groups, are incorporated into the molecule as a result of partial oxidation and, in addition, the microstructure of the polymer is substantially altered.

The preparation of HNBR having low molar masses corresponding to a Mooney viscosity (ML 1+4 at 100° C.) in the range below 55 or a number average molecular weight of about $M_n<200 000$ g/mol was for a long time not possible by means of established production processes since, firstly, a steep increase in the Mooney viscosity occurs in the hydrogenation of NBR and, secondly, the molar mass of the NBR feedstock used for the hydrogenation cannot be reduced at will since otherwise the work-up can no longer be carried out in the industrial plants available because the product is too sticky. The lowest Mooney viscosity of an NBR feedstock which can be processed without difficulties in an established industrial plant is about 30 Mooney units (ML 1+4 at 100° C.). The Mooney viscosity of the hydrogenated nitrile rubber obtained using such an NBR feedstock is in the order of 55 Mooney units (ML 1+4 at 100° C.).

In the more recent prior art, this problem is solved by reducing the molecular weight of the nitrile rubber prior to hydrogenation by degradation to a Mooney viscosity (ML 1+4 at 100° C.) of less than 30 Mooney units or a number average molecular weight of $M_n<70 000$ g/mol. The decrease in the molecular weight is achieved here by metathesis in which low molecular weight 1-olefins are usually added. The metathesis reaction is advantageously carried out in the same solvent as the hydrogenation reaction, so that the degraded NBR feedstock does not have to be isolated from the solvent after the degradation reaction is complete before it is subjected to the subsequent hydrogenation. Metathesis catalysts which have a tolerance towards polar groups, in particular towards nitrile groups, are used for catalysing the metathetic degradation reaction.

WO-A-02/100905 and WO-A-02/100941 describe a process which comprises degradation of nitrile rubber starting polymers by olefin metathesis and subsequent hydrogenation. Here, a nitrile rubber is reacted in a first step in the presence of a coolefin and a specific catalyst based on osmium, ruthenium, molybdenum or tungsten complexes and hydrogenated in a second step. Hydrogenated nitrile rubbers having a weight average molecular weight ($M_w$) in the range from 30 000 to 250 000, a Mooney viscosity (ML 1+4 at 100° C.) in the range from 3 to 50 and a polydispersity index PDI of less than 2.5 can be obtained by this route according to WO-A-02/100941.

Metathesis catalysts are known, inter alia, from WO-A-96/04289 and WO-A-97/06185. They have the following in-principle structure:

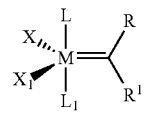

where M is osmium or ruthenium, R and $R_1$ are organic radicals having a wide range of structural variation, X and $X_1$ are anionic ligands and L and $L_1$ are uncharged electron donors. The customary term "anionic ligands" is used in the literature regarding such metathesis catalysts to describe ligands which are always negatively charged with a closed electron shell when regarded separately from the metal centre.

Such catalysts are suitable for ring-closing metatheses (RCM), cross-metatheses (CM) and ring-opening metatheses (ROMP). However, the catalysts mentioned are not necessarily suitable for carrying out the degradation of nitrile rubber.

The metathesis of nitrile rubber can be successfully carried out using some catalysts from the group of "Grubbs (I) catalysts". A suitable catalyst is, for example, a ruthenium catalyst having particular substitution patterns, e.g. the catalyst bis(tricyclohexylphosphine)benzylideneruthenium dichloride shown below.

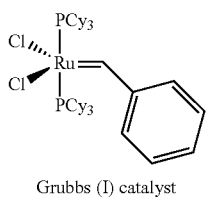

Grubbs (I) catalyst

After metathesis and hydrogenation, the nitrile rubbers have a lower molecular weight and also a narrower molecular weight distribution than the hydrogenated nitrile rubbers which have hitherto been able to be prepared according to the prior art.

However, the amounts of Grubbs (I) catalyst employed for carrying out the metathesis are large. In the experiments in WO-A-03/002613, they are, for example, 307 ppm and 61 ppm of Ru based on the nitrile rubber used. The reaction times necessary are also long and the molecular weights after the degradation are still relatively high (see Example 3 of WO-A-03/002613, in which $M_w=180\,000$ g/mol and $M_n=71\,000$ g/mol).

US 2004/0127647 A1 describes blends based on low molecular weight HNBR rubbers having a bimodal or multimodal molecular weight distribution and also vulcanisates of these rubbers. To carry out the metathesis, 0.5 phr of Grubbs I catalyst, corresponding to 614 ppm of ruthenium based on the nitrile rubber used, is used according to the examples.

Furthermore, WO-A-00/71554 discloses a group of catalysts which are known in the technical field as "Grubbs (II) catalysts".

If such a "Grubbs (II) catalyst", e.g. 1,3-bis(2,4,6-trimethylphenyl)-2-imidazolidenylidene) (tricyclohexylphosphine) ruthenium(phenylmethylene) dichloride, is used for the NBR metathesis, this also succeeds without use of a coolefin (US-A-2004/0132891). After the subsequent hydrogenation, which is preferably carried out in the same solvent, the hydrogenated nitrile rubber has lower molecular weights and a narrower molecular weight distribution (PDI) than when using catalysts of the Grubbs (I) type. In terms of the molecular weight and the molecular weight distribution, the metathetic degradation thus proceeds more efficiently when using catalysts of the Grubbs II type than when using catalysts of the Grubbs I type. However, the amounts of ruthenium necessary for this efficient metathetic degradation are still relatively high. Long reaction times are also still required for carrying out the metathesis using the Grubbs II catalyst.

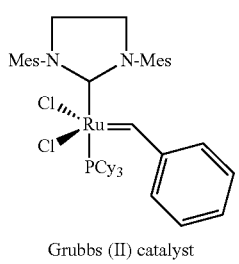

Grubbs (II) catalyst

In all the abovementioned processes for the metathetic degradation of nitrile rubber, relatively large amounts of catalyst have to be used and long reaction times are required in order to produce the desired low molecular weight nitrile rubbers.

It is therefore an object of the invention to provide a catalyst which is able to catalyse metathetic degradation of nitrile rubber with a higher activity than the metathesis catalysts available at present and thus makes possible an increase in the reaction rate and the setting of lower molecular weights of the degraded nitrile rubber at a comparable noble metal content.

The invention provides a process for the molecular weight degradation of a nitrile rubber comprising a metathesis reaction of a nitrile rubber in the presence of a catalyst of the general formulae (I)-(III),

 (I)

 (II)

 (III)

where

M is ruthenium or osmium, $X^1$ and $X^2$ are identical or different ligands, preferably anionic ligands, $Z^1$ and $Z^2$ are identical or different and neutral electron donor ligands, $R^3$ and $R^4$ are identical or different and represent hydrogen or a substituent selected from the group consisting of alkyl, cycloalkyl, alkenyl, alkynyl, aryl, carboxylate, alkoxy, alkenyloxy, alkynyloxy, aryloxy, alkoxycarbonyl, alkylamino, dialkylamino, alkylthio, arylthio, alkylsulphonyl and alkylsulphinyl radicals, each of which may optionally be substituted by one or more substituents, preferably alkyl, halogen, alkoxy, aryl or heteroaryl radicals, and L is a ligand.

The catalysts of the general formulae (I)-(III) are known in principle. Representatives of this class of compounds are the catalysts described by Grubbs et al. in WO 2003/011455 A1, Grubbs et al. WO 2003/087167 A2, Organometaliics 2001, 20, 5314 and Angew. Chem. Int. Ed. 2002, 41, 4038. The catalysts are commercially available or can be prepared as described in the references cited.

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of radicals, parameters or explanations given above or below in general terms or in preferred ranges can be combined with one another in any way, i.e. including combinations of the respective ranges and preferred ranges.

$Z^1$ and $Z^2$

In the process of the present invention the catalysts of general formulae (I), (II) and (III) are used in which $Z^1$ and $Z^2$ are identical or different ligands being neutral electron donor ligands. Such ligands are in general weakly coordinating. Typically they represent optionally substituted heterocyclic groups which may have heterocyclic aliphatic, heterocyclic unsaturated or heteroaromatic structures. They may represent five- or six-membered monocyclic groups containing 1 to 4, preferably 1 to 3 and more preferably 1 or 2 heteroatoms, or bicyclic or polycyclic structures composed of 2, 3, 4 or 5 such five- or six-membered monocyclic groups wherein all aforementioned groups are optionally substituted by one or more substituents. Preferably the aforementioned monocyclic, bi- oder polycyclic groups have an aromatic structure. The substituents of the aforementioned monocyclic, bi-oder polycyclic groups include straight chain- or branched alkyl, preferably $C_1$-$C_{20}$-alkyl, $C_1$-$C_{20}$ heteroalkyl, cycloalkyl, preferably $C_3$-$C_8$-cycloalkyl, alkoxy, preferably $C_1$-$C_{10}$-alkoxy, halogen, preferably fluorine, chlorine and bromine, aryl, preferably $C_6$-$C_{24}$-aryl, more preferably phenyl, biphenyl, naphthyl, phenanthrenyl and anthracenyl, heteroaryl, preferably $C_5$-$C_{23}$-heteroaryl, formyl, nitro, nitrogen containing heterocycles, preferably pyridine, piperidine and pyrazine, carboxy, alkylcarbonyl, preferably $C_1$-$C_{20}$-alkylcarbonyl, halocarbonyl, carbamoyl, thiocarbomoyl, carbamido, thioformyl, amino, trialkylsilyl und trialkoxysilyl, where all these abovementioned substituents may in turn be substituted by one or more radicals—as far as chemically reasonable and plausible, preferably selected from the group consisting of halogen, in particular fluorine, chlorine or bromine, $C_1$-$C_5$-alkyl, $C_1$-$C_5$-alkoxy and phenyl.

Examples of $Z^1$ and $Z^2$ include, without limitation: nitrogen containing, optionally substituted heterocycles such as pyridine, picolines (α-, β-, and γ-picoline), lutidines (2,3-, 2,4-, 2,5-, 2,6-, 3,4- and 3,5-lutidine), collidine (2,4,6-trimethylpyridine), trifluormethylpyridine, phenylpyridine, chloropyridines (2-, 3- and 4-chloropyridine), brompyridines (2-, 3- and 4-bromopyridine), pyridazine, bipyridine, pyrimidine, pyrazine, pyrazolidine, pyrrolidine, piperazine, indazole, purine, acridine, bisimidazole, picolylimine, imidazolidine, pyrrole, quinoline, imidazole and phenylimidazol.

$Z^1$ and $Z^2$ together may also represent a bidentate ligand, thereby forming a cyclic, preferably aromatic structure.

L

In the catalysts of the general formulae (I), (II) and (III), L is a ligand, usually a ligand having an electron donor function.

The ligand L can, for example, be a phosphine, a sulphonated phosphine, phosphate, phosphinite, phosphonite, arsine, stibine, ether, amine, amide, sulphoxide, carboxyl, nitrosyl, pyridine, thioether or imidazolidine ("Im") ligand.

Preference is given to ligand L being a $C_6$-$C_{24}$-arylphosphine, $C_1$-$C_6$-alkylphosphine or $C_3$-$C_{10}$-cycloalkylphosphine ligand, a sulphonated $C_6$-$C_{24}$-arylphosphine or a sulphonated $C_1$-$C_{10}$-alkylphosphine ligand, a $C_6$-$C_{24}$-aryl phosphinite or $C_1$-$C_{10}$-alkyl phosphinite ligand, a $C_6$-$C_{24}$-aryl phosphonite or $C_1$-$C_{10}$-alkyl phosphonite ligand, a $C_6$-$C_{24}$-aryl phosphite or $C_1$-$C_{10}$-alkylphosphite ligand, a $C_6$-$C_{24}$-arylarsine or $C_1$-$C_{10}$-alkylarsine ligand, a $C_6$-$C_{24}$-arylamine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, each of which may be substituted by a phenyl group which may in turn be substituted by a halogen, $C_1$-$C_5$ alkyl radical or $C_1$-$C_5$-alkoxy radical.

$C_6$-$C_{24}$-Aryl encompasses an aromatic radical having from 6 to 24 skeletal carbon atoms. Preferred monocyclic, bicyclic or tricyclic carbocyclic aromatic radicals having from 6 to 10 skeletal carbon atoms are, for example, phenyl, biphenyl, naphthyl, phenanthrenyl and anthracenyl.

$C_1$-$C_6$-Alkyl is, for example, methyl, ethyl, n-propyl, isopropyl, n-butyl, sec-butyl, tert-butyl, n-pentyl, 3-methylbutyl, 2-methylbutyl, 3-methylbutyl, neopentyl, 1-ethylpropyl or n-hexyl.

$C_3$-$C_{10}$-Cycloalkyl encompasses cyclopropyl, cyclobutyl, cyclopentyl, cyclohexyl, cycloheptyl and cyclooctyl.

With regard to the meaning of ligand L the term "phosphine" includes $PR_3$ structures like for example, $PPh_3$, P(p-Tol)$_3$, P(o-Tol)$_3$, PPh(CH$_3$)$_2$, P(CF$_3$)$_3$, P(p-FC$_6$H$_4$)$_3$, P(p-CF$_3$C$_6$H$_4$)$_3$, P(C$_6$H$_4$—SO$_3$Na)$_3$, P(CH$_2$C$_6$H$_4$—SO$_3$Na)$_3$, P(iso-Pr)$_3$, P(CHCH$_3$(CH$_2$CH$_3$))$_3$, P(cyclopentyl)$_3$, P(cyclohexyl)$_3$, P(neopentyl)$_3$ and P(neophenyl)$_3$.

With regard to the meaning of ligand L the term "phosphinite" includes, for example, triphenyl phosphinite, tricyclohexyl phosphinite, triisopropyl phosphinite and methyl diphenylphosphinite.

With regard to the meaning of ligand L the term "phosphite" includes, for example, triphenyl phosphite, tricyclohexyl phosphite, tri-tert-butyl phosphite, triisopropyl phosphite and methyl diphenyl phosphate.

With regard to the meaning of ligand L the term "stibine" includes, for example, triphenylstibine, tricyclohexylstibine and trimethylstibene.

With regard to the meaning of ligand L the term "sulphonate" includes, for example, trifluoromethanesulfonate, tosylate and mesylate.

With regard to the meaning of ligand L the term "sulphoxide" includes, for example, CH$_3$S(=O)CH$_3$ and (C$_6$H$_5$)$_2$SO.

With regard to the meaning of ligand L the term "thioether" includes, for example, CH$_3$SCH$_3$, C$_6$H$_5$SCH$_3$, CH$_3$OCH$_2$CH$_2$SCH$_3$ and tetrahydrothiophene.

With regard to the meaning of ligand L and in the context of this application the term "pyridine" shall encompass nitrogen-containing ligands on the basis of pyridine and any derivatives thereof as e.g. disclosed in WO-A-03/011455. This shall include as examples: pyridine, picolines (α-, β-, und γ-Picolin), lutidines (2,3-, 2,4-, 2,5-, 2,6-, 3,4- und 3,5-lutidine), collidine (2,4,6-trimethylpyridine), trifluormethylpyridine, phenylpyridine, 4-(Dimethylamino)pyridine, chloropyridines, bromopyridines, nitropyridines, chinolin, pyrimidine, pyrrole, imidazole und phenylimidazole.

The imidazolidine radical (Im) usually has a structure of the general formula (IVa) or (IVb),

(IVa)

(IVb)

where
R$^5$, R$^6$, R$^7$, R$^8$ are identical or different and are each hydrogen, straight-chain or branched $C_1$-$C_{30}$-alkyl, preferably $C_1$-$C_{20}$-alkyl, $C_3$-$C_{20}$-cycloalkyl, preferably $C_3$-$C_{10}$-cycloalkyl, $C_2$-$C_{20}$-alkenyl, preferably $C_2$-$C_{10}$-alkenyl, $C_2$-$C_{20}$-alkynyl, preferably $C_2$-$C_{10}$-alkynyl, $C_6$-$C_{24}$-aryl, preferably $C_6$-$C_{14}$-aryl, $C_1$-$C_{20}$-carboxylate, preferably $C_1$-$C_{10}$-carboxylate, $C_1$-$C_{20}$-alkoxy, preferably $C_1$-$C_{10}$-alkoxy, $C_2$-$C_{20}$-alkenyloxy, preferably $C_2$-$C_{10}$-alkenyloxy, $C_2$-$C_{20}$-alkynyloxy, preferably $C_2$-$C_{10}$-alkynyloxy, $C_6$-$C_{20}$-aryloxy, preferably $C_6$-$C_{14}$-aryloxy, $C_2$-$C_{20}$-alkoxycarbonyl, preferably $C_2$-$C_{10}$-alkoxycarbonyl, $C_1$-$C_{20}$-alkylthio, preferably $C_1$-$C_{10}$-alkylthio, $C_6$-$C_{20}$-arylthio, preferably $C_6$-$C_{14}$-arylthio, $C_1$-$C_{20}$-alkylsulphonyl, preferably $C_1$-$C_{10}$-alkylsulphonyl, $C_1$-$C_{20}$-alkylsulphonate, preferably $C_1$-$C_{10}$-alkylsulphonate, $C_6$-$C_{20}$-arylsulphonate, preferably $C_6$-$C_{14}$-arylsulphonate, or $C_1$-$C_{20}$-alkylsulphinyl, preferably $C_1$-$C_{10}$-alkylsulphinyl.

One or more of the radicals $R^5$, $R^6$, $R^7$, $R^8$ may, independently of one another, optionally be substituted by one or more substituents, preferably straight-chain or branched $C_1$-$C_{10}$-alkyl, $C_3$-$C_8$-cycloalkyl $C_1$-$C_{10}$-alkoxy or $C_6$-$C_{24}$-aryl, where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

Only for the sake of clarity it is hereby confirmed that the structures as depicted in the general formulae (IVa) and (IVb) of this application with regard to the structure of the imidazolidine ("Im")-radical shall have the same meaning as the structures often shown and used in the relevant literature with regard to such imidazolidine radicals which are hereinafter depicted as structures (IVa') und (IVb') and which emphasize the carben-like structure of the imidazolidine radical. The same shall apply to the structures (Va)-(Vf) which are lateron depicted in this application and which also have a carben-like structure.

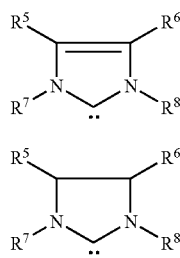

In a preferred embodiment of the catalysts of the general formulae (I), (II) or (III) a ligand L is present in which $R^5$ and $R^6$ are each, independently of one another, hydrogen, $C_6$-$C_{24}$-aryl, particularly preferably phenyl, straight-chain or branched $C_1$-$C_{10}$-alkyl, particularly preferably propyl or butyl, or together form, with inclusion of the carbon atoms to which they are bound, a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In a preferred embodiment of the catalysts of the general formulae (I), (II) or (III) a ligand L is present in which the radicals $R^7$ and $R^8$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

These radicals $R^7$ and $R^8$ which are mentioned above as being preferred may optionally be substituted by one or more further radicals selected from the group consisting of straight-chain or branched $C_1$-$C_5$-alkyl, in particular methyl or isopropyl, $C_1$-$C_5$-alkoxy, aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In particular, the radicals $R^7$ and $R^8$ are identical or different and are each i-propyl, neopentyl, adamantyl, mesityl or 2,6-diisopropylphenyl.

Particularly preferred imidazolidine radicals (Im) have the structures (Va)-(Vf), where Mes is in each case a 2,4,6-trimethylphenyl radical or alternatively in each case a 2,6-diisopropylphenyl radical.

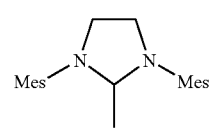
(Va)

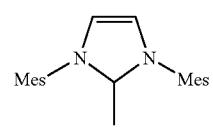
(Vb)

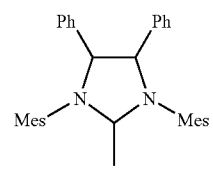
(Vc)

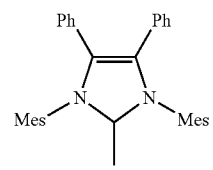
(Vd)

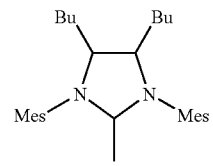
(Ve)

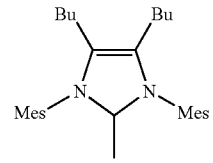
(Vf)

$R^3$ and $R^4$

In the process of the present invention the catalysts of general formulae (I), (II) and (III) are used in which $R^3$ and $R^4$ are identical or different and hydrogen or a substituent selected from the group consisting of alkyl, preferably $C_1$-$C_{30}$-alkyl, more preferably $C_1$-$C_{20}$-alkyl, cycloalkyl, preferably $C_3$-$C_{20}$-cycloalkyl, more preferable $C_3$-$C_8$-cycloalkyl, alkenyl, preferably $C_2$-$C_{20}$-alkenyl, more preferable $C_2$-$C_{16}$-alkenyl, alkynyl, preferably $C_2$-$C_{20}$-alkynyl more preferably $C_2$-$C_{16}$-alkynyl, aryl, preferably $C_6$-$C_{24}$-aryl, more preferably phenyl, biphenyl, naphthyl, phenanthrenyl and anthracenyl, carboxylate, preferably $C_1$-$C_{20}$-carboxylate, alkoxy, preferably $C_1$-$C_{20}$-alkoxy, more preferable $C_1$-$C_{10}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, more preferable $C_2$-$C_{16}$-alkoxycarbonyl, alkylamino, preferably $C_1$-$C_{20}$-alkylamino, dialkylamino, preferably di($C_1$-$C_{20}$-alkyl)amino, alkylthio, preferably $C_1$-$C_{30}$-alkylthio, more preferable $C_1$-$C_{20}$-alkylthio, arylthio, preferably $C_6$-$C_{24}$-arylthio, alkylsulphonyl, preferably $C_1$-$C_{20}$-alkylsulphonyl, and alkylsulphinyl, preferably $C_1$-$C_{20}$-alkylsulphinyl, each of which may optionally be substituted by one or more substituents, including but not limited to alkyl, halogen, preferably chlorine or bromine, alkoxy, aryl or heteroaryl radicals.

More preferably $R^3$ is hydrogen and $R^4$ has the aforementioned meanings except hydrogen.

$X^1$ and $X^2$

In the process of the present invention catalysts of general formulae (I), (II) and (III) are used in which $X^1$ and $X^2$ are identical or different ligands, preferably anionic ligands. In the literature, the customary term "anionic ligands" always refers, in the context of such metathesis catalysts, to ligands which, when they are regarded separately from the metal centre, would be negatively charged for a closed electron shell.

In the catalysts of the general formulae (I), (II) and (III), $X^1$ and $X^2$ are identical or different and can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketanate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl radicals, where the latter radicals may optionally also in turn be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and represent halogen, in particular fluorine, chlorine or bromine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate, or $CF_3SO_3$ (trifluoromethanesulphonate).

Particular preference is given to a process according to the invention using catalysts of the general formula (I), (II) or (III) in which M is ruthenium, $X^1$ and $X^3$ are both halogen, in particular, both chlorine, $Z^1$ and $Z^2$ are identical or different and represent five- or six-membered monocyclic, preferably aromatic groups containing 1 to 4, preferably 1 to 3, most preferably 1 or 2 heteroatoms, or bicyclic or polycyclic, preferably aromatic structures composed of 2, 3, 4 or 5 such five- or six-membered monocyclic groups wherein all aforementioned groups are optionally substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$ heteroaryl radicals, or $Z^1$ and $Z^2$ together represent a bidentate ligand, thereby forming a cyclic, preferably aromatic structure, $R^3$ and $R^4$ are identical or different and are each hydrogen or a substituent selected from the group consisting of $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, di($C_1$-$C_{20}$-alkyl)amino, $C_1$-$C_{30}$-alkylthio, $C_6$-$C_{24}$-arylthio, $C_1$-$C_{20}$-alkylsulphonyl, and $C_1$-$C_{20}$-alkylsulphinyl, each of which may optionally be substituted by one or more by one or more substituents, preferably alkyl, halogen, alkoxy, aryl or heteroaryl radicals, and L has a structure of the general formula (IVa) or (IVb),

(IVa)

(IVb)

where $R^5$, $R^6$, $R^7$, $R^8$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate, or $C_1$-$C_{20}$-alkylsulphinyl.

A particularly preferred catalyst which comes under the general structural formula (I) is that of the formula (VI)

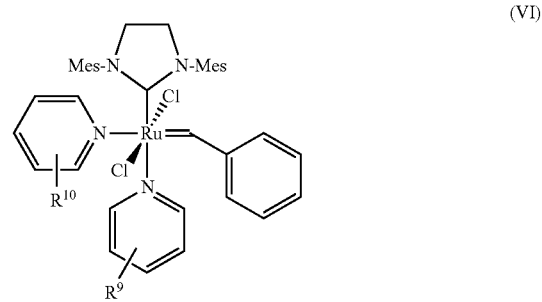

(VI)

where $R^9$ and $R^{10}$ are identical or different and represent halogen, straight-chain or branched $C_1$-$C_{20}$ alkyl, $C_1$-$C_{20}$ heteroalkyl, $C_1$-$C_{10}$ haloalkyl, $C_1$-$C_{10}$ alkoxy, $C_6$-$C_{24}$ aryl, preferably phenyl, formyl, nitro, nitrogen containing heterocycles, preferably pyridine, piperidine and pyrazine, carboxy, alkylcarbonyl, halocarbonyl, carbamoyl, thiocarbomoyl, carbamido, thioformyl, amino, trialkylsilyl und trialkoxysilyl.

With regard to the meaning of $R^9$ and $R^{10}$ the aforementioned alkyl, heteroalkyl, haloalkyl, alkoxy, ary, nitrogen containing heterocycles, alkylcarbonyl, halocarbonyl, carbamoyl, thiocarbamoyl and amino radicals may optionally also in turn be substituted by one or more substituents selected from the group consisting of halogen, preferably fluorine, chlorine, or bromine, $C_1$-$C_5$-alkyl, $C_1$-$C_5$-alkoxy and phenyl.

In a particularly preferred embodiment the catalyst (VI) has the general structural formula (VIa) or (VIb), wherein $R^9$ and $R^{10}$ have the same meaning as given for structural formula (VI).

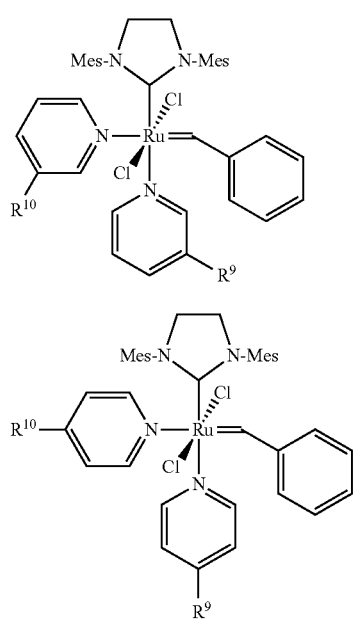

(VIa)

(VIb)

In the case where $R^9$ and $R^{10}$ are each hydrogen, catalyst (VI) is referred to as "Grubbs III catalyst" in the literature.

Further suitable catalysts which come under the general structural formulae (I)-(III) are those of the formulae (VII), (VIII), (IX), (X), (XI), (XII), (XIII), (XIV), (XV) and (XVI), where Mes is in each case a 2,4,6-trimethylphenyl radical.

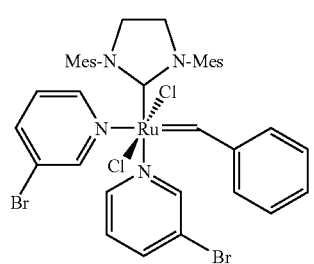

(VII)

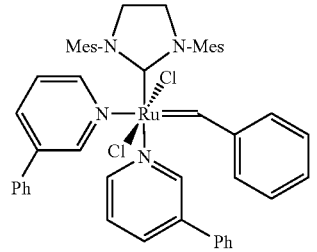

(VIII)

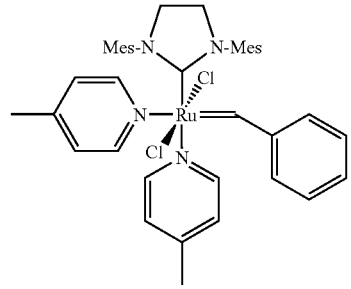

(IX)

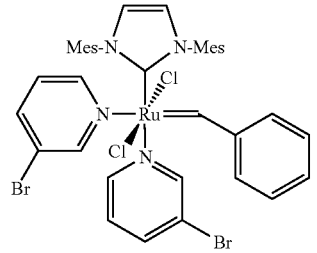

(X)

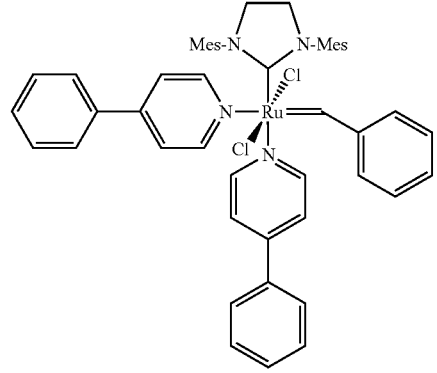

(XI)

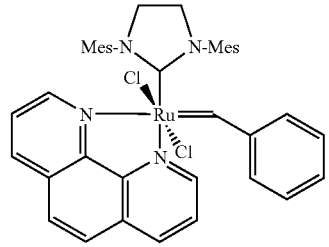

(XII)

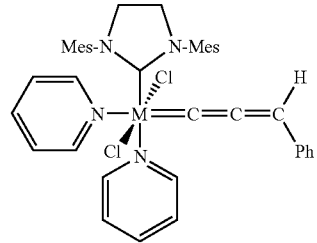

(XIII)

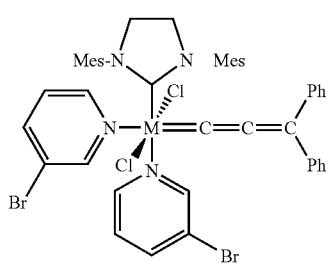
(XIV)

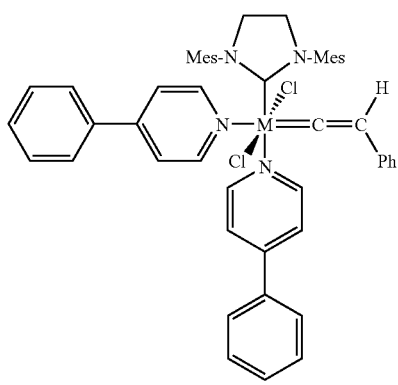
(XV)

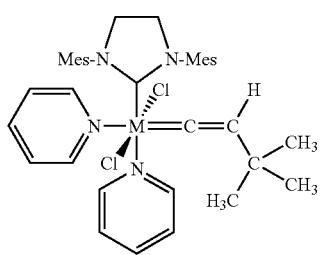
(XVI)

All the abovementioned catalysts of the formulae (I)-(III) and (Vf)-(XVI) can either be used as such for the NBR metathesis or can be applied to and immobilized on a solid support. As solid phases or supports, it is possible to use materials which firstly are inert towards the reaction mixture of the metathesis and secondly do not impair the activity of the catalyst. It is possible to use, for example, metals, glass, polymers, ceramic, organic polymer spheres, inorganic sol-gels, silica, silicates, calcium carbonate or barium sulfate for immobilizing the catalyst.

The catalysts of all the abovementioned general and specific formulae (I)-(III) and (VI)-(XVI) are highly suitable for the metathetic degradation of nitrile rubber.

In the process according to the present invention, a nitrile rubber is subjected to a metathetic degradation reaction in the presence of a catalyst of the general formula (I)-(III).

The amount of the catalyst used according to the invention for the metathesis depends on the nature and the catalytic activity of the specific catalyst. The amount of catalyst used is from 5 to 1000 ppm of noble metal, preferably from 5 to 500 ppm, in particular from 5 to 250 ppm, based on the nitrile rubber used.

The NBR metathesis can be carried out without a coolefin or in the presence of a coolefin. This is preferably a straight-chain or branched $C_2$-$C_{16}$-olefin. Suitable coolefins are, for example, ethylene, propylene, isobutene, styrene, 1-hexene and 1-octene. Preference is given to using 1-hexene or 1-octene. If the coolefin is liquid (as in the case of, for example, 1-hexene), the amount of coolefin is preferably in the range 0.2-20% by weight based on the nitrile rubber used. If the coolefin is a gas, as in the case of, for example, ethylene, the amount of coolefin is selected so that a pressure in the range $1 \times 10^5$ Pa-$1 \times 10^7$ Pa, preferably a pressure in the range from $5.2 \times 10^5$ Pa to $4 \times 10^6$ Pa, is established in the reaction vessel at room temperature.

The metathesis reaction can be carried out in a suitable solvent which does not deactivate the catalyst used and also does not adversely affect the reaction in any other way. Preferred solvents include but are not restricted to dichloromethane, benzene, toluene, methyl ethyl ketone, acetone, tetrahydrofuran, tetrahydropyran, dioxane and cyclohexane. The particularly preferred solvent is chlorobenzene. In some cases, when the coolefin itself can function as solvent, e.g. in the case of 1-hexene, the addition of a further additional solvent can also be omitted.

The concentration of the nitrile rubber used in the reaction mixture of the metathesis is not critical, but care naturally has to be taken to ensure that the reaction is not adversely affected by an excessively high viscosity of the reaction mixture and the mixing problems associated therewith. The concentration of NBR in the reaction mixture is preferably in the range from to 20% by weight, particularly preferably in the range from 5 to 15% by weight, based on the total reaction mixture.

The metathetic degradation is usually carried out at a temperature in the range from 10° C. to 150° C., preferably in the range from 20° C. to 100° C.

The reaction time depends on a number of factors, for example, on the type of NBR, the type of catalyst, the catalyst concentration used and the reaction temperature. The reaction is typically complete within three hours under normal conditions. The progress of the metathesis can be monitored by standard analytical methods, e.g. by GPC measurement or by determination of the viscosity.

As nitrile rubbers ("NBR"), it is possible to use copolymers or terpolymers which comprise repeating units of at least one conjugated diene, at least one α,β-unsaturated nitrile and, optionally one or more further copolymerizable monomers in the metathesis reaction.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrile, it is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A particularly preferred nitrile rubber is thus a copolymer of acrylonitrile and 1,3-butadiene.

Apart from the conjugated diene and the α,β-unsaturated nitrile, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth) acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrile in the NBR polymers to be used can vary within wide ranges. The proportion of or of the sum of the conjugated dienes is usually in the range from 40 to 90% by weight, preferably in the range from 55 to 75% by weight, based on the total polymer. The proportion of or of the sum of the α,β-unsaturated nitriles is usually from 10 to 60% by weight, preferably from 25 to 45% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrile or nitriles are replaced by the proportions of the additional monomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

The nitrile rubbers used for the metathesis have a Mooney viscosity (ML 1+4 at 100° C.) in the range from 5 to 70, preferably from 30 to 50. This corresponds to a weight average molecular weight $M_w$ in the range 50 000-500 000, preferably in the range 200 000-400 000. The nitrile rubbers used also have a polydispersity $PDI=M_w/M_n$, where $M_w$ is the weight average molecular weight and $M_n$ is the number average molecular weight, in the range 1.7-6.0 and preferably in the range 2.0-3.0.

The determination of the Mooney viscosity is carried out in accordance with ASTM standard D 1646.

The nitrile rubbers obtained by the metathesis process according to the invention have a Mooney viscosity (ML 1+4 at 100° C.) in the range from 2 to 30, preferably in the range from 5 to 20. This corresponds to a weight average molecular weight $M_w$ in the range 10 000-200 000, preferably in the range 10 000-150 000. The nitrile rubbers obtained also have a polydispersity $PDI=M_w/M_n$, where $M_n$ is the number average molecular weight, in the range 1.5-4.0, preferably in the range 1.7-3.

It may be appropriate to not only use one of the aforementioned metathesis catalysts in the process according to the invention, but also to add one or more salts of the general formula (XVII)

$$K^{n+}A^{z-} \quad (XVII)$$

where
K is a cation and
A is an anion,
n is 1, 2 or 3 and
z is 1, 2 or 3.

Suitable cations are based on elements from the Periodic Table (main groups and transition elements) which can form cations bearing one, two or three positive charges.

Suitable cations are, for example, lithium, sodium, potassium rubidium, caesium, francium, beryllium, magnesium, calcium, strontium, barium, aluminium, gallium, indium, thallium, germanium, tin, lead, arsenic, antimony, bismuth, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, silver, gold, zinc, cadmium, mercury and also all elements of the group of the rare earths, in particular cerium, praseodynium and neodymium, and the elements of the actinides.

Further suitable cations are complex cations based on nitrogen, phosphorus or sulphur. It is possible to use, for example, tetraalkylammonium, tetraarylammonium, hydroxylammonium, tetraalkylphosphonium, tetraarylphosphonium, sulphonium, anilinium, pyridinium, imidazolium, guanidinium and hydrazinium cations and also cationic ethylenediamine derivatives.

The alkyl radicals in all the abovementioned complex cations can be identical or different and are usually each a straight-chain or branched $C_1$-$C_{30}$-alkyl radical, preferably a $C_1$-$C_{20}$-alkyl radical, particularly preferably a $C_1$-$C_{18}$-alkyl radical. These alkyl radicals can also be substituted by aryl radicals. $C_1$-$C_{18}$-Alkyl encompasses, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2, 2-trimethylpropyl, 1-ethyl-1-methylpropyl, 1-ethyl-2-methylpropyl, n-heptyl, n-octyl, n-nonyl, n-decyl, n-undexyl, n-dodecyl, n-tridecyl, n-tetradecyl, n-hexadecyl, n-octadecyl and benzyl.

The aryl radicals in all the abovementioned complex cations can likewise be identical or different and are usually each a $C_6$-$C_{24}$-aryl radical, preferably a $C_6$-$C_{24}$-aryl radical, particularly preferably a $C_6$-$C_{10}$-aryl radical. Examples of $C_6$-$C_{24}$-aryl are phenyl, o-, p-, m-tolyl naphthyl, phenanthrenyl, anthracenyl and fluorenyl.

The sulphonium cations of the $[R_3S]^+$ type bear three identical or different radicals which can be aliphatic or aromatic in nature. These radicals can be alkyl or aryl radicals having the abovementioned general, preferred and particularly preferred meanings.

Particularly preferred complex cations are benzyldodecyldimethylammonium, didecyldimethylammonium, dimethylanilinium, N-alkyl-N,N-bis-(2-hydroxyalkyl)-N-benzylammonium, N,N,N-triethylbenzolmethanaminium, O-methyluronium, S-methylthiuronium, pyridinium, tetrabutylammonium, tetramethyluronium, tetracetylammonium, tetrabutylphosphonium, tetraphenylphosphonium, diphenylguanidinium, di-o-tolylguanidinium, butyldiphenylsulphonium, tributylsulphonium.

In the general formula (I), A is a singly, doubly, or triply charged anion, preferably from the group consisting of halides, pseudohalides, complex anions, anions of organic acids, aliphatic or aromatic sulphonates, aliphatic or aromatic sulphates, phosphonates, phosphates, thiophosphates, xanthogenates, dithiocarbamates and noncoordinating anions.

Preferred halides are fluoride, chloride, bromide, iodide, more preferably the fluoride, chloride, bromide or iodide of lithium, sodium, potassium and caesium.

Preferred pseudohalides are, for example triiodide, azide, cyanide, thiocyanide, thiocyanate and interhalides.

Suitable complex anions are, for example, sulphite, sulphate, dithionite, thiosulphate, carbonate, hydrogencarbonate, perthiocarbonate, nitrite, nitrate, perchlorate, tetrafluoroborate, tetrafluoroaluminate, hexafluorophosphate, hexafluoroarsenate, and hexachloroantimonate.

Preferred singly, doubly or triply charged anions of organic acids are singly, doubly or triply charged anions of organic carboxylic acids having from 1 to 20 carbon atoms. The organic carboxylic acids can be saturated or monounsaturated or polyunsaturated. Selected examples are formate, acetate, propionate, butyrate, oleate, palmitate, stearate, versatate, acrylate, methacrylate, crotonate, benzoate, naphthalenecarbonate, oxalate, salicylate, terephthalate, fumarate, maleate, itaconate and abietate.

Suitable aliphatic or aromatic sulphonates are anthraquinone-2-sulphonate, benzenesulphonate, benzene-1,3-disulphonate, decane-1-sulphonate, hexadecane-1-sulphonate, hydroquinonemono-sulphonate, methyl-4-toluenesulphonate, naphthalene-1-sulphonate, naphthalene-1,5-disulphonate, tosylate and mesylate.

Suitable aliphatic or aromatic sulphates are, for example, dodecylsulphate and alkylbenzenesulphates.

Suitable phosphonates, phosphates and thiophosphates are vinylphosphonate, ethylphosphonate, butylphosphonate, cetylphosphonate, dibutylphosphate, dioctylphosphate, dibutyldithiophosphate and dioctylthiophosphate.

Suitable aliphatic or aromatic xanthogenates are ethylxanthogenate, butylxanthogenate, phenylxanthogenate, benzylxanthogenate, etc.

Suitable aliphatic or aromatic dithiocarbamates are dimethyldithiocarbamate, diethyldithiocarbamate, dibutyldithiocarbamate and dibenzyldithiocarbamate.

Noncoordinating anions are, for example, tetrakis[pentafluorophenyl]borate, pentakis-[pentafluorophenyl]phosphate, tetrakis[3,5-trifluoromethylphenyl]borate, pentakis[3,5-trifluoro-methylphenyl]phosphate and pentakis[pentafluorophenyl]cyclohexadienyl anion.

The metathetic degradation process according to the invention can be followed by a hydrogenation of the degraded nitrile rubbers obtained. This can be carried out in the manner known to those skilled in the art.

It is possible to carry out the hydrogenation with use of homogeneous or heterogeneous hydrogenation catalysts. It is also possible to carry out the hydrogenation in situ, i.e. in the same reaction vessel in which the metathetic degradation has previously also been carried out and without the necessity of isolating the degraded nitrile rubber. The hydrogenation catalyst is simply added to the reaction vessel.

The catalysts used are usually based on rhodium, ruthenium or titanium, but it is also possible to use platinum, iridium, palladium, rhenium, osmium, cobalt or copper either as metal or preferably in the form of metal compounds (cf., for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can be achieved, for example, in the presence of a rhodium- or ruthenium-containing catalyst. It is possible to use, for example, a catalyst of the general formula $(R^1{}_mB)_lMX_n$, where M is ruthenium or rhodium, the radicals $R^1$ are identical or different and are each a $C_1$-$C_8$-alkyl group, a $C_4$-$C_8$-cycloalkyl group, a $C_6$-$C_5$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethylsulphoxide)rhodium(III) chloride and also tetrakis (triphenylphosphine)rhodium hydride of the formula $(C_6H_5)_3$P)RhH and the corresponding compounds in which the triphenylphosphine has been completely or partly replaced by tricyclohexylphosphine. The catalyst can be utilized in small amounts. An amount in the range 0.01-1% by weight, preferably in the range 0.03-0.5% by weight and particularly preferably in the range 0.1-0.3% by weight, based on the weight of the polymer, is suitable.

It is usually appropriate to use the catalyst together with a co-catalyst which is a ligand of the formula $R^1{}_mB$, where $R^1$, m and B have the meanings given above for the catalyst. Preferably, m is 3, B is phosphorus and the radicals $R^1$ can be identical or different. Preference is given to cocatalysts having trialkyl, tricycloalkyl, triaryl, triaralkyl, diarylmonoalkyl, diaryl-monocycloalkyl, dialkyl-monoaryl, dialkyl-monocycloalkyl, dicyctoalkyl-monoaryl or dicycloalkyl-monoaryl radicals.

Examples of co-catalysts may be found in, for example, U.S. Pat. No. 4,631,315. A preferred cocatalyst is triphenylphosphine. The co-catalyst is preferably used in amounts in the range 0.3-5% by weight, preferably in the range 0.5-4% by weight, based on the weight of the nitrile rubber to be hydrogenated. Furthermore, the weight ratio of the rhodium-containing catalyst to the cocatalyst is preferably in the range from 1:3 to 1:55, more preferably in the range from 1:5 to 1:45. Based 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst per 100 parts by weight of the nitrile rubber to be hydrogenated.

The practical implementation of this hydrogenation is adequately known to those skilled in the art from U.S. Pat. No. 6,683,136. It is usually carried out by treating the nitrile rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of the double bonds present in the starting nitrile rubber to an extent of at least 50%, preferably 70-100%, particularly preferably 80-100%.

When heterogeneous catalysts are used, these are usually supported catalysts based on palladium which are, for example, supported on carbon, silica, calcium carbonate or barium sulphate.

EXAMPLES

In the following examples, it is shown that, in each case at the same amount of ruthenium, the metathesis activity of the catalysts according to the invention is higher than when the Grubbs II catalyst is used.

The following catalysts were used:

"Grubbs III Catalyst" (According to the Invention):

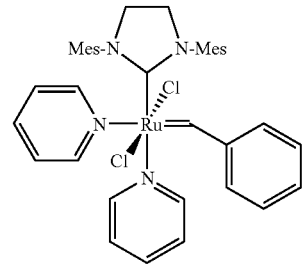

The Grubbs III catalyst was produced via the preparation outlined in Grubbs et al., Angew. Chem. Int. Ed., 2002, 41(21), 4035.

Grubbs II Catalyst (Comparison):

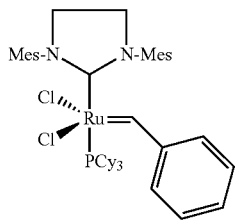

The Grubbs II catalyst was procured from Materia (Pasadena/Calif.).

The degradation reactions described below were carried out using the nitrile rubber Perbunan® NT 3435 from Lanxess Deutschland GmbH. This nitrile rubber had the following characteristic properties:

| | |
|---|---|
| Acrylonitrile content: | 35% by weight |
| Mooney viscosity (ML 1 + 4 @100° C.): | 34 Mooney units |
| Residual moisture content: | 1.8% by weight |
| $M_w$: | 240 000 g/mol |
| $M_n$: | 100 000 g/mol |
| PDI ($M_w/M_n$): | 2.4 |

In the text that follows, this nitrile rubber is referred to as NBR for short.

General Description of the Metathesis Reactions Carried Out

The metathetic degradation was in each case carried out using 293.3 g of chlorobenzene (hereinafter referred to as "MCB"/from Aldrich) which had been distilled and made inert by passing argon through it at room temperature before use. 40 g of NBR were dissolved therein at room temperature over a period of 10 hours. 0.8 g (2 phr) of 1-hexene was in each case added to the NBR-containing solution and the mixture was stirred for 30 minutes to homogenize it.

The metathesis reactions were carried out using the amounts of starting materials indicated in the following tables at room temperature.

The Ru-containing catalysts were in each case dissolved in 20 g of MCB at room temperature under argon. The addition of the catalyst solutions to the NBR solutions in MCB was carried out immediately after the preparation of the catalyst solutions. After the reaction times indicated below in the tables, about 5 ml were in each case taken from the reaction solutions and immediately admixed with about 0.2 ml of ethyl vinyl ether to stop the reaction and subsequently diluted with 5 ml of DMAc (N,N-dimethylacetamide from Aldrich). 2 ml of the solutions were in each case placed in a GPC bottle and diluted with DMAc to 3 ml. Before carrying out the GPC analysis, the solutions were in each case filtered by means of a 0.2 μm syringe filter made of Teflon (Chromafil PTFE 0.2 μm; from Machery-Nagel). The GPC analysis was subsequently carried out using a Waters instrument (Mod. 510). The analysis was carried out using a combination of 4 columns from Polymer Laboratories: 1) PLgel 5 μm Mixed-C, 300×7.5 mm, 2) PLgel 5 μm Mixed-C, 300×7.5 mm, 3) PLgel 3 μm Mixed-E, 300×7.5 mm, and 4) PLgel 3 μm Mixed-E, 300×7.5 mm.

The calibration of the GPC columns was carried out using linear poly(methyl methacrylate) from Polymer Standards Services. An RI detector from Waters (Waters 410) was used as detector. The analysis was carried out at a flow rate of 0.5 ml/min using DMAc at 70° C. as eluent. The GPC curves were evaluated using software from Millenium.

The following characteristic properties were determined by means of GPC analysis both for the original NBR rubber (before degradation) and for the degraded nitrile rubbers:

| | |
|---|---|
| $M_w$ [kg/mol]: | weight average molar mass |
| $M_n$ [kg/mol]: | number average molar mass |
| PDI: | width of the molar mass distribution ($M_w/M_n$) |

Example Series 1-3

Activity comparison of the "Grubbs III catalyst" with the "Grubbs II catalyst" in the presence of 2 phr of 1-hexene.

In the example series 1 and 2, the activity of the "Grubbs III catalyst" was compared with that of the "Grubbs II catalyst" at two ruthenium contents (23 ppm and 57 ppm). These activity comparisons were carried out using 2.0 phr of 1-hexene.

Example 1.1

According to the Invention

"Grubbs III catalyst" using 23 ppm of ruthenium and 2.0 phr of 1-hexene

| NBR | "Grubbs III catalyst" | | | 1-Hexene | | |
|---|---|---|---|---|---|---|
| Amount [g] | Amount [mg] | Amount [phr] | Ru [ppm] | Amount [g] | Amount [phr] | Temperature [° C.] |
| 40 | 80 | 0.02 | 23 | 0.8 | 2.0 | 23 |

| | "Grubbs III catalyst" Reaction time [min.] | | |
|---|---|---|---|
| Analytical data | 0 | 15 | 60 |
| $M_w$ [kg/mol] | 240 | 150 | 144 |
| $M_n$ [kg/mol] | 100 | 71 | 72 |
| PDI | 2.4 | 2.1 | 2.0 |

The degraded nitrile rubbers obtained in Example 1.1 were gel-free.

Example 1.2

Comparison

"Grubbs II catalyst" using 23 ppm of ruthenium and 2.0 phr of 1-hexene

| NBR | "Grubbs II catalyst" | | | 1-Hexene | | Temperature |
|---|---|---|---|---|---|---|
| Amount | Amount | Amount | Ru | Amount | Amount | |
| [g] | [mg] | [phr] | [ppm] | [g] | [phr] | [° C.] |
| 40 | 80 | 0.02 | 23 | 0.8 | 2.0 | 23 |

| Analytical data | "Grubbs II catalyst" Reaction time [min.] | | |
|---|---|---|---|
|  | 0 | 15 | 90 |
| $M_w$ [kg/mol] | 240 | 204 | 168 |
| $M_n$ [kg/mol] | 100 | 70 | 62 |
| PDI | 2.4 | 2.9 | 2.7 |

Comparison of the decrease in the molecular weight $M_w$ in Examples 1.1 and 1.2 shows that at an amount of ruthenium of 23 ppm the activity of the "Grubbs III catalyst" is significantly higher than that of the "Grubbs II catalyst". Similarly the polydispersity of the resulting polymers are significantly narrower for those examples done with "Grubbs III catalyst" in comparison to "Grubbs II catalyst".

Example 2.1

According to the Invention

"Grubbs III catalyst" using 57 ppm of ruthenium and 2.0 phr of 1-hexene

| NBR | "Grubbs III catalyst" | | | 1-Hexene | | Temperature |
|---|---|---|---|---|---|---|
| Amount | Amount | Amount | Ru | Amount | Amount | |
| [g] | [mg] | [phr] | [ppm] | [g] | [phr] | [° C.] |
| 40 | 200 | 0.05 | 57 | 0.8 | 2.0 | 23 |

| Analytical data | "Grubbs III catalyst" Reaction time [min.] | | |
|---|---|---|---|
|  | 0 | 15 | 90 |
| $M_w$ [kg/mol] | 240 | 39 | 36 |
| $M_n$ [kg/mol] | 100 | 21 | 20 |
| PDI | 2.4 | 1.8 | 1.8 |

The degraded nitrile rubbers obtained in Example 2.1 were gel-free.

Example 2.2

According to the Invention

"Grubbs II catalyst" using 57 ppm of ruthenium and 2.0 phr of 1-hexene

| NBR | "Grubbs II catalyst" (MW = 848.97 g/mol) | | | 1-Hexene | | Temperature |
|---|---|---|---|---|---|---|
| Amount | Amount | Amount | Ru | Amount | Amount | |
| [g] | [mg] | [phr] | [ppm] | [g] | [phr] | [° C.] |
| 40 | 200 | 0.05 | 57 | 0.8 | 2.0 | 23 |

| Analytical data | "Grubbs II catalyst" Reaction time [min.] | | |
|---|---|---|---|
|  | 0 | 30 | 90 |
| $M_w$ [kg/mol] | 240 | 176 | 65 |
| $M_n$ [kg/mol] | 100 | 64 | 33 |
| PDI | 2.4 | 2.7 | 1.9 |

A comparison of Example 3 "Grubbs III catalyst" with "Grubbs II catalyst" with a loading of 57 ppm of ruthenium showed that the molecular weight $M_w$ at identical reaction times were lower when using the "Grubbs III catalyst" than when using the "Grubbs II catalyst". This phenominum was also observed with respect to the polydispersities of the resulting polymers.

The invention claimed is:

1. A process for the molecular weight degradation of a nitrile rubber comprising a metathesis reaction of a nitrile rubber in the presence of a catalyst of the general formula (I),

(I)

where
M is ruthenium or osmium,
$X^1$ and $X^2$ are identical or different anionic ligands,
$Z^1$ and $Z^2$ are identical or different and neutral electron donor ligands,
$R^3$ and $R^4$ are identical or different and hydrogen or a substituent selected from the group consisting of alkyl, cycloalkyl, alkenyl, alkynyl, aryl, carboxylate, alkoxy, alkenyloxy, alkynyloxy, aryloxy, alkoxycarbonyl, alkylamino, dialkylamino, alkylthio, arylthio, alkylsulphonyl and alkylsulphinyl radical, each of which may optionally be substituted by one or more substituents, and
L is a ligand.

2. The process according to claim 1, wherein a catalyst of the general formula (I) is used in which $Z^1$ and $Z^2$ are identical or different and represent optionally substituted heterocyclic groups which may be substituted by one or more straight chain- or branched alkyl, heteroalkyl, cycloalkyl, alkoxy, halogen, aryl, heteroaryl, formyl, nitro, nitrogen containing heterocycles, carboxy, alkylcarbonyl, halocarbonyl, carbamoyl, thiocarbomoyl, carbamido, thioformyl, amino, trialkylsilyl and trialkoxysilyl, wherein all these substituents may in turn be substituted by one or more radicals.

3. The process according to claim 1, wherein a catalyst of the general formula (I) is used in which $Z^1$ and $Z^2$ are identical or different and represent a five- or six-membered monocyclic group, or bicyclic or polycyclic groups wherein all aforementioned groups may be substituted by one or more straight chain- or branched $C_1$-$C_{20}$-alkyl, $C_1$-$C_{20}$ heteroalkyl, $C_3$-$C_8$-cycloalkyl, $C_1$-$C_{10}$-alkoxy, chlorine or bromine, phenyl, biphenyl, naphthyl, phenanthrenyl and anthracenyl, $C_5$-$C_{23}$-heteroaryl, formyl, nitro, pyridine, piperidine and pyrazine, carboxy, $C_1$-$C_{20}$-alkylcarbonyl, halocarbonyl, carbamoyl, thiocarbomoyl, carbamido, thioformyl, amino, trialkylsilyl and trialkoxysilyl, where all these substituents may in turn be substituted by one or more radicals selected from the group consisting of fluorine, chlorine, bromine, $C_1$-$C_5$-alkyl, $C_1$-$C_5$-alkoxy and phenyl.

4. The process according to claim 1, wherein a catalyst of the general formula (I) is used in which $Z^1$ and $Z^2$ are identical or different and represent pyridine, picolines, collidine, trifluormethylpyridine, phenylpyridine, chloropyridines, brompyridines, pyridazine, bipyridine, pyrimidine, pyrazine, pyrazolidine, pyrrolidine, piperazine, indazole, quinoline, purine, acridine, bisimidazole, picolylimine, imidazolidine, pyrrole, imidazole and phenylimidazol or in which in the alternative $Z^1$ and $Z^2$ together represent a bidentate ligand under formation of a cyclic structure.

5. The process according to claim 1 or 2, wherein a catalyst of the general formula (I) is used in which the ligand L is a phosphine, a sulphonated phosphine, phosphate, phosphinite, phosphonite, arsine, stibine, ether, amine, amide, sulphoxide, carboxyl, nitrosyl, pyridine, thioether or an imidazolidine ("Im") ligand.

6. The process according to claim 1 or 2, wherein a catalyst of the general formula (I) is used in which the ligand L is a $C_6$-$C_{24}$-arylphosphine, $C_1$-$C_6$-alkylphosphine or $C_3$-$C_{10}$-cycloalkylphosphine ligand, a sulphonated $C_6$-$C_{24}$-arylphosphine or a sulphonated $C_1$-$C_{10}$-alkylphosphine ligand, a $C_6$-$C_{24}$-aryl phosphinite or $C_1$-$C_{10}$-alkyl phosphinite ligand, a $C_6$-$C_{24}$-aryl phosphonite or $C_1$-$C_{10}$-alkyl phosphonite ligand, a $C_6$-$C_{24}$-aryl phosphite or $C_1$-$C_{10}$-alkylphosphite ligand, a $C_6$-$C_{24}$-arylarsine or $C_1$-$C_{10}$-alkylarsine ligand, a $C_6$-$C_{24}$-arylamine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide, each of which may be substituted by a phenyl group which may in turn be substituted by a halogen, $C_1$-$C_5$ alkyl radical or $C_1$-$C_5$-alkoxy radical.

7. The process according to claim 6, wherein a catalyst of the general formula (I) is used in which L is selected from the group consisting of $PPh_3$, $P(p\text{-Tol})_3$, $P(o\text{-Tol})_3$, $PPh(CH_3)_2$, $P(CF_3)_3$, $P(p\text{-}FC_6H_4)_3$, $P(p\text{-}CF_3C_6H_4)_3$, $P(C_6H_4\text{—}SO_3Na)_3$, $P(CH_2C_6H_4\text{—}SO_3Na)_3$, $P(\text{iso-Pr})_3$, $P(CHCH_3(CH_2CH_3))_3$, $P(\text{cyclopentyl})_3$, $P(\text{cyclohexyl})_3$, $P(\text{neopentyl})_3$ and $P(\text{neophenyl})_3$.

8. The process according to claim 5, wherein the imidazolidine radical (Im) has a structure of the general formula (IVa) or (IVb),

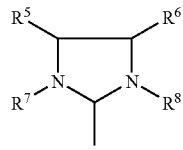

(IVa)

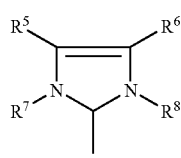

(IVb)

where $R^5, R^6, R^7, R^8$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_8$-$C_{20}$-arylsulphonate, or $C_1$-$C_{20}$-alkylsulphinyl, wherein the aforementioned substituents may optionally be substituted by one or more substituents, selected from the group consisting of straight-chain or branched $C_1$-$C_{10}$-alkyl, $C_3$-$C_8$-cycloalkyl, $C_1$-$C_{10}$-alkoxy or $C_6$-$C_{24}$-aryl, where these aforementioned substituents may in turn be substituted by one or more radicals, selected from the group consisting of chlorine, bromine, $C_1$-$C_5$-alkyl, $C_1$-$C_5$-alkoxy and phenyl.

9. The process according to claim 8 wherein the imidazolidine radical (Im) with the general formula (IVa) or (IVb) is used, where $R^5, R^6, R^7, R^8$ are identical or different and are each hydrogen, straight-chain or branched $C_1$-$C_{20}$-alkyl, $C_3$-$C_{10}$-cycloalkyl, $C_2$-$C_{10}$-alkenyl, $C_2$-$C_{10}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_8$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate, or $C_1$-$C_{10}$-alkylsulphinyl wherein the aforementioned substituents may optionally be substituted by one or more substituents as defined in claim 8.

10. The process according to claim 5, wherein the imidazolidine radical (Im) has a structure of the formulae (Va)-(Vf), where Mes is in each case a 2,4,6-trimethylphenyl radical or alternatively in each case a 2,6-diisopropylphenyl radical

(Va)

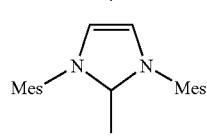

(Vb)

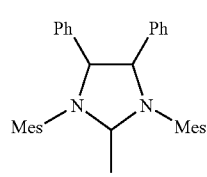

(Vc)

-continued

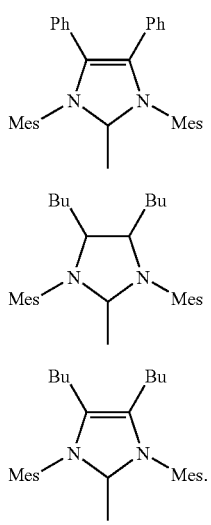

(Vd)

(Ve)

(Vf)

11. The process according to claim 1 or 2, wherein a catalyst of the general formula (I) is used in which $R^3$ and $R^4$ are identical or different and are each an alkyl, cycloalkyl, alkenyl, alkynyl, aryl, carboxylate, alkoxy, alkenyloxy, alkynyloxy, aryloxy, alkoxycarbonyl, alkylamino, dialkylamino, alkylthio, alkylsulphonyl, or alkylsulphinyl radical, each of which may optionally be substituted by one or more substituents.

12. The process according to claim 1, wherein a catalyst of the general formula (I) is used in which $R^3$ and $R^4$ are identical or different and are each an $C_1$-$C_{20}$-alkyl, $C_3$-$C_8$-cycloalkyl, $C_2$-$C_{16}$-alkenyl, $C_2$-$C_{16}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, ($C_1$-$C_{20}$-alkyl)amino, di($C_1$-$C_{20}$-allyl)amino, $C_1$-$C_{30}$-alkylthio, $C_6$-$C_{24}$-arylthio, $C_1$-$C_{20}$-alkylsulphonyl, or $C_1$-$C_{20}$-alkylsulphinyl radical, each of which may optionally be substituted by one or more substituents selected from the group consisting of alkyl, halogen, alkoxy, aryl and heteroaryl radicals.

13. The process according to claim 1, wherein a catalyst of the general formula (I) is used in which $X^1$ and $X^2$ are identical or different and represent hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

14. The process according to claim 1, wherein a catalyst of the general formula (I) is used in which $X^1$ and $X^2$ are identical or different and are each fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

15. The process according to claim 1, wherein a catalyst of the general formulae (I) is used in which $X^1$ and $X^2$ are each halogen, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate, $CF_3SO_3$ (trifluoromethanesulphonate).

16. The process according to claim 1, wherein a catalyst of the general formula (I) is used in which
M is ruthenium,
$X^1$ and $X^2$ are both halogen,
$Z^1$ and $Z^2$ are identical or different and represent five- or six-membered monocyclic groups containing 1 to 4 heteroatoms, or bicyclic or polycyclic structures composed of 2, 3, 4 or 5 such five- or six-membered monocyclic groups wherein all aforementioned groups are optionally substituted by one or more alkyl, cycloalkyl, alkoxy, halogen, aryl, or heteroaryl radicals, or $Z^1$ and $Z^2$ together represent a bidentate ligand, thereby forming a cyclic structure, $R^3$ and $R^4$ are identical or different and are each $C_1$-$C_{30}$-alkyl $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl, $C_1$-$C_{20}$-alkylsulphinyl, each of which may optionally be substituted by one or more substituents selected from the group consisting of alkyl, halogen, alkoxy, aryl and heteroaryl radicals, and L has a structure of the general formula (IVa) or (IVb),

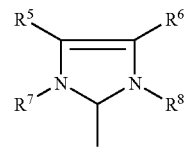

(IVa)

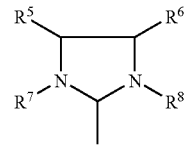

(IVb)

where
$R^5$, $R^6$, $R^7$, $R^8$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate, or $C_1$-$C_{20}$-alkylsulphinyl, each of which may optionally be substituted by one or more substituents selected from the group consisting of alkyl, halogen, alkoxy, aryl and heteroaryl radicals.

17. The process according to claim 1, wherein a catalyst of the formula (VI) is used,

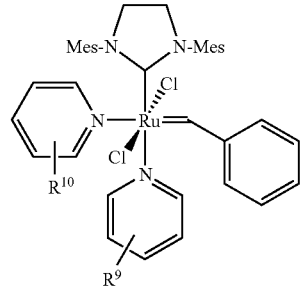

(VI)

where
$R^9$ and $R^{10}$ are identical or different and represent halogen, straight-chain or branched $C_1$-$C_{20}$ alkyl, $C_1$-$C_{20}$ heteroalkyl, $C_1$-$C_{10}$ haloalkyl, $C_1$-$C_{10}$ alkoxy, $C_6$-$C_{24}$ aryl, preferably phenyl, formyl, nitro, pyridine, piperidine and pyrazine, carboxy, alkylcarbonyl, halocarbonyl, carbamoyl, thiocarbomoyl, carbamido, thioformyl, amino, trialkylsilyl und trialkoxysilyl.

18. The process according to claim 1, wherein a catalyst of the formulae (VII), (VIII), (IX), (X), (XI), (XII), (XIII), (XIV), (XV) or (XVI) is used, where Mes is in each case a 2,4,6-trimethylphenyl radical

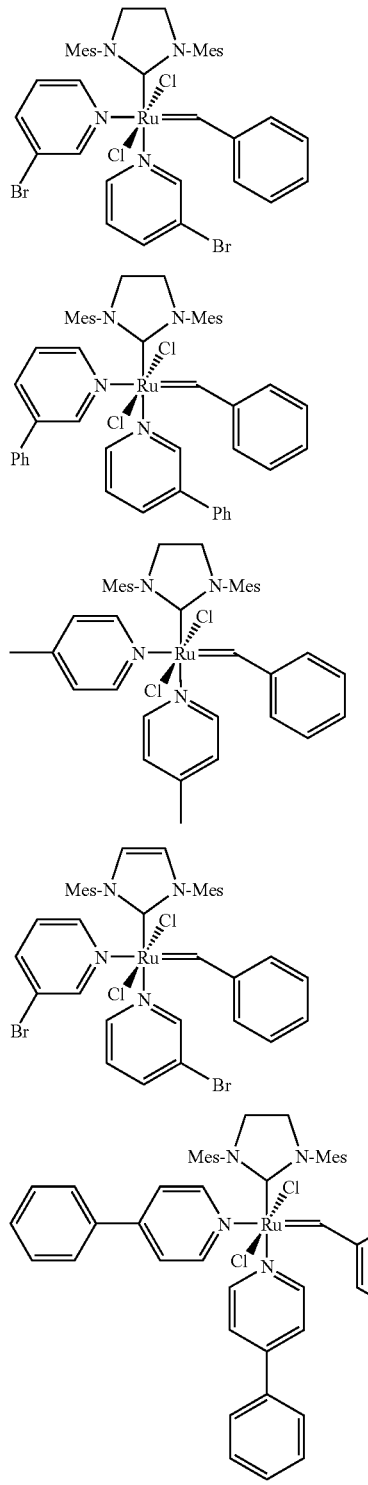

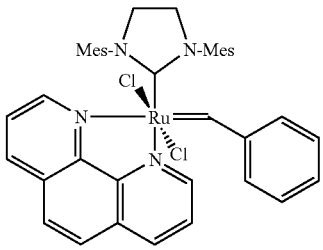

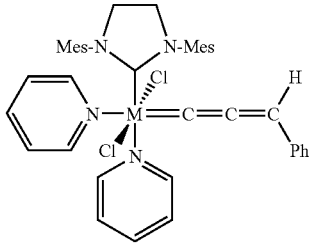

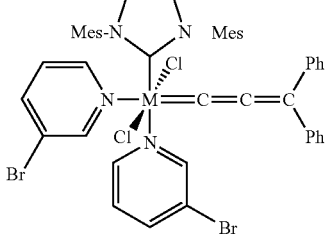

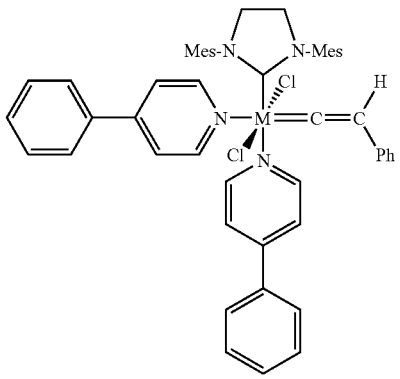

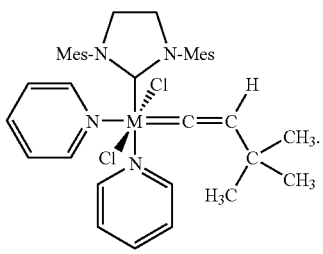

19. The process according to claim 1, in which the amount of catalyst used is from 5 to 1000 ppm of noble metal based on the nitrile rubber used.

20. The process according to claim 1, in which the amount of catalyst used is from 5 to 500 ppm of noble metal, based on the nitrile rubber used.

21. The process according to claim 1, in which the amount of catalyst used is from 5 to 250 ppm of noble metal, based on the nitrile rubber used.

22. The process according to claim 1, which is carried out in the presence of a co-olefin.

23. The process according to claim 1, which is carried out in the presence of a coolefin, selected from the group consisting of a straight-chain or branched $C_2$-$C_{16}$-olefin.

24. The process according to claim 1, which is carried out in the presence of a coolefin, selected from the group consisting of ethylene, propylene, isobutene, styrene, 1-hexene and 1-octene.

25. The process according to claim 1, in which the concentration of the nitrile rubber in the reaction mixture is in the range from 1 to 20% by weight based on the total reaction mixture.

26. The process according to claim 1, which is carried out at a temperature in the range from 10° C. to 150° C.

27. The process according to claim 1, wherein the nitrile rubber subjected to the molecular weight degradation is a copolymer or a terpolymer which comprises repeating units of at least one conjugated diene, at least one α,β-unsaturated nitrile and, optionally one or more further copolymerizable monomers in the metathesis reaction.

28. The process according to claim 27, wherein one or more further copolymerizable monomers are used, selected from the group consisting of α,β-unsaturated monocarboxylic or dicarboxylic acids, their esters or amides.

29. The process according to claim 28, wherein one or more further copolymerizable monomers are used, selected from the group consisting of fumaric acid, maleic acid, acrylic acid, methacrylic acid, methyl acrylate, ethyl acrylate, butyl acrylate, butyl methacrylate, 2-ethylhexyl acrylate, 2-ethylhexyl methacrylate, octyl acrylate, methoxyethyl (meth)acrylate, ethoxyethyl(meth)acrylate and methoxyethyl(meth)acrylate.

30. The process according to claim 1, wherein the metathesis reaction of the nitrile rubber is followed by a hydrogenation reaction of the unsaturated C=C double bonds in the nitrile rubber.

* * * * *